Dec. 28, 1948. J. E. A. GRAAE 2,457,461
CATALYST FEEDER
Filed May 29, 1946

INVENTOR.
Johan E. A. Graae
BY Nathaniel Ely
ATTORNEY

Patented Dec. 28, 1948

2,457,461

UNITED STATES PATENT OFFICE 2,457,461

CATALYST FEEDER

Johan E. A. Graae, New York, N. Y., assignor to The Lummus Company, New York, N. Y., a corporation of Delaware Application May 29, 1946, Serial No. 673,125

6 Claims. (Cl. 214—17)

This invention relates to the handling of granular material and is concerned with the maintenance of a gas seal in a transfer of such material required in certain processes. For example, in a certain type of catalytic reaction system for hydrocarbon conversion a granular catalyst is continuously passed through a reaction zone and a catalyst regeneration zone in succession and thence back to the reaction zone. It is customary, in order to preserve a required pressure differential between the zones to constrain the catalyst in the passage thereof from zone to zone to form a long sealing leg. That practice, however, necessitates an objectionably tall apparatus. Alternatively, the catalyst may be passed from zone to zone through a mechanical sealing and feeding device. Such devices, in their usual forms, however, are apt to cause crushing or abrasion of the catalyst grains so that the size of the grains will be reduced below that required for optimum performance. Fines will also be produced and carried off with the reaction products or with the gases discharged from the regeneration zone, with consequent waste of catalyst.

An important object of the present invention is to provide for transfer of granular material from zone to zone in an improved manner devised to maintain a gas seal in the transfer without the employment of a tall sealing leg and without crushing grains of the material.

Another object of the invention is to provide an improved device for effecting such transfer of the granular material, with adequate sealing effect and protection of the material from crushing.

These and other objects of the invention will appear from the following description taken in connection with the accompanying drawing.

Figures 1, 2, 3, 4:
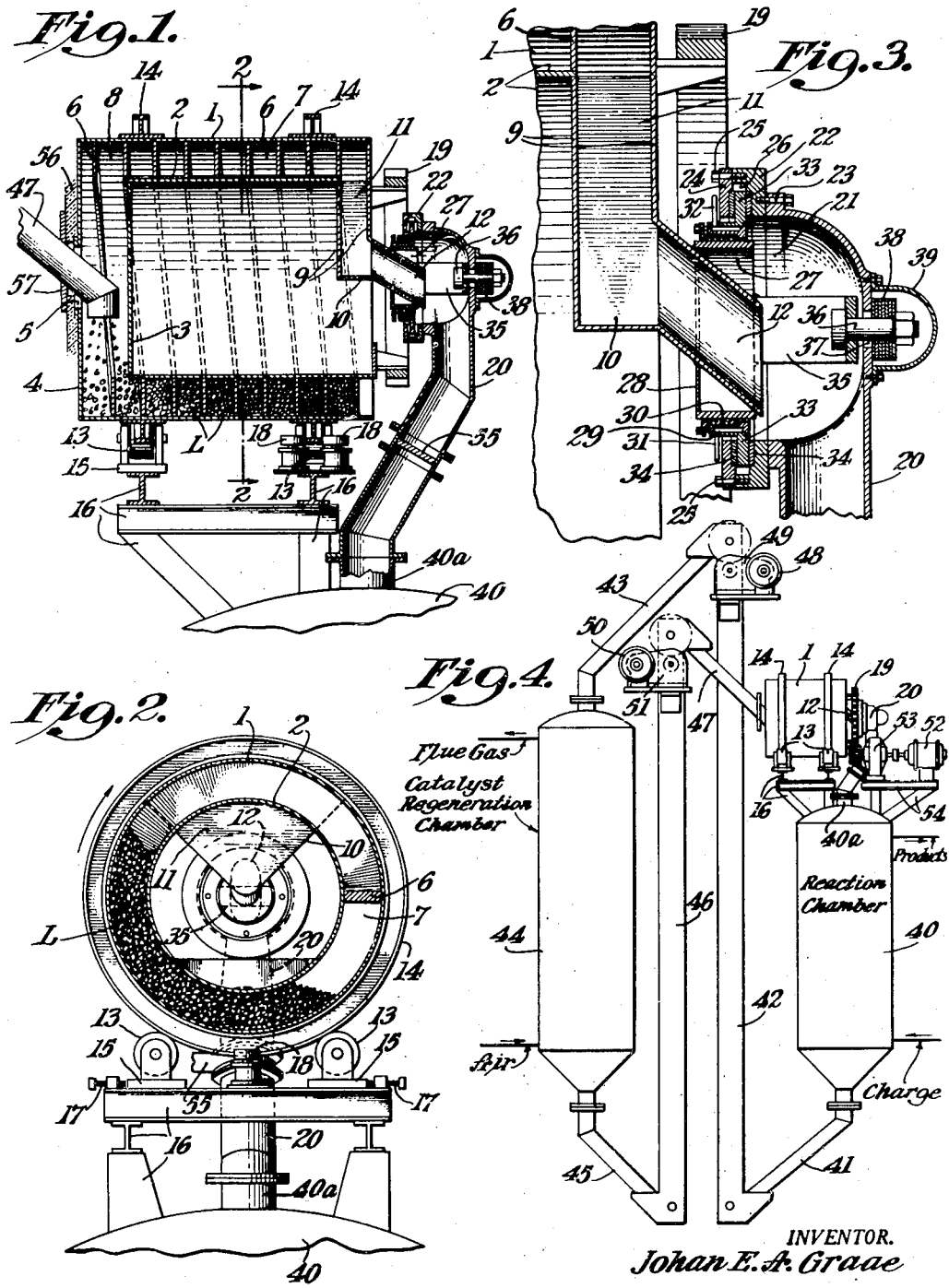
Fig. 1 is a vertical sectional view of the improved transfer device.
Fig. 2 is a transverse section on the line 2—2 of Fig. 1.
Fig. 3 is an enlarged vertical sectional view of a portion of the discharge end of the device.
Fig. 4 is an elevation of a catalytic reaction system embodying the invention.

According to the invention, the granular material is transferred from zone to zone through a tubular conduit which defines a multi-coil helix disposed with its axis non-vertical and preferably horizontal, or substantially so. The granular material is continuously passed from one zone into one end of the conduit and the latter is continuously rotated without axial movement, to advance the material therethrough and discharge it from the opposite end of the conduit. Thence, the material is passed to another zone through a fixed conduit which is maintained in sealed connection with the discharge end of the rotating conduit. Within the rotating conduit the material gravitates to the portions of the coils at the under side of the axis and there becomes compacted by gravity to form within the successive coils a series of sealing legs whose total sealing effect is sufficient to maintain a required pressure differential between the zones.

The feeder or transfer device for effecting the transfer just described includes a rotor comprising a pair of concentric cylindrical drums 1 and 2. The inner drum is materially shorter than the outer drum and has an end wall 3 in spaced opposition to an end wall 4 of the outer drum. Wall 4 has a central aperature 5 through which the material is charged to the rotor. At the opposite end of the rotor the ends of the drums are substantially flush. Between the circumferential walls of the drums there is a helical wall 6 secured along its edges to both drums and defining therewith a tubular conduit 7 of multi-coil helical form. The said helical wall also extends beyond the closed inner end of the drum 2 and forms, with the outer drum 1, an open channel 8 continuous with the said tubular conduit. At the opposite end of the rotor a pair of spaced flat walls 9, transverse to the axis, and an approximately V-shaped wall 10 form a hopper 11 tapering from the circumferential wall of the outer drum to the axis of the rotor and there having a discharge spout 12 at an inclination to the axis. The adjacent end of the helical conduit opens directly into one side of this hopper and the hopper forms a part of the rotor.

Two pairs of rollers 13 rotatably support the rotor. The latter has affixed thereto a pair of circumferential tires 14 each engaging a pair of the rollers. Preferably, the tires are approximately I-shaped in cross section for rapid cooling thereof. The rollers are supported by slides 15 mounted upon a supporting frame structure 16, and the slides are individually adjustable by means of set screws 17. A pair of guide rollers 18, also supported upon the frame structure, engage opposite sides of one of the tires to hold the rotor against endwise displacement. A gear wheel 19 is affixed to the discharge end of the rotor for driving the latter.

A fixed tubular discharge chute 20 is in sealed connection with the spout 12 of the rotor. This chute has an inlet aperature 21 located on the axis of the rotor and facing the discharge end of the rotor. A ring 22 is bolted, as at 23, to the chute, around the margin of the aperture 21, and an annular plate 24 is bolted, as at 25, to the ring and forms therewith an annular channel 26. A journal ring 27, coaxial with the rotor, surrounds the spout 21, and a plate 28 secured to the inner face of said journal ring and to the spout prevents passage of gas through the ring, past the spout, the latter being welded therearound to the said ring and plate to prevent leakage. A bearing ring 29 encircles the journal ring 27 and, between said rings, there is a stuffing box construction 30, or other suitable packing. The bearing ring is jacketed to receive a cooling liquid which is supplied through a pipe 31 and discharged through a pipe 32. An outwardly projecting annular flange 33 on the bearing ring is fitted between annular plates 34 of anti-friction material mounted within the channel 26 between the ring 22 and the plate 24. Thereby a sealed connection is provided between the rotor and the fixed chute 20. The spout 12 and its attached journal ring 27 rotate within the surrounding stuffing box while the flange 33 of the bearing ring may slip edgewise between the plates 34 and permit lateral play or adjustment of the rotor.

A U-shaped yoke 35 has its ends secured to the journal ring 27 at diametricaly opposite points, and the bend of the yoke has a sealed swivel connection with the chute 20. This swivel connection includes a bolt 36 which extends from the yoke outwardly through a hole 37 in the back wall of the chute and through apertured sealing and anti-friction disks 38 which abut the margin of said hole. A nut is screwed upon the bolt, and a cap 39 detachably secured to the chute encloses the nut and the disks 38. The swivel connection resists endwise displacement of the rotor by gas pressure within the chute.

In Fig. 4 the feeder device just described is shown embodied in a catalytic reaction system of the type disclosed in a U. S. patent to Simpson et al., No. 2,320,318. In such a system a granular catalyst whose grains are preferably of bead form or pellet form are continuously passed downwardly through a reaction chamber 40. From the lower end of said chamber the catalyst is passed through a tubular chute 41, in sealed connection with the chamber, to the lower end of an enclosed endless conveyor 42, vertically arranged. The chute 41 is kept charged with the catalyst to form a sealing leg. Conveyor 42 elevates the catalyst and discharges it, through a tubular chute 43, into a catalyst regeneration chamber 44 and the regenerated catalyst is continuously discharged through a chute 45, in sealed connection with the lower end of chamber 43, to the lower end of an enclosed endless conveyor 46. Conveyor 46 elevates the catalyst and discharges it, through an inclined tubular chute 47, into the feeder device. The feeder device is interposed between said chute and the reaction chamber 40, the discharge chute 20 being flanged at its lower end and detachably secured in sealed connection to a flanged inlet nozzle 40a projecting from the upper end of the reaction chamber.

The conveyor or elevator 42 is driven by a motor 48, through reduction gearing 49, and the elevator 46 is driven by a motor 50, through reduction gearing 51. A motor 52 drives the rotor of the feeder device, through reduction gearing 53 operatively connected to the gear 19 on the rotor. Motor 52 and its reduction gearing are supported on a frame structure 54. This frame structure and the structure 16 for supporting the feed rotor are shown supported by the reaction chamber; they may, however, be otherwise supported.

Chute 47 which continuously delivers regenerated catalyst to the feeder device extends through the inlet aperture 5 of the rotor and discharges the catalyst downwardly into the open helical channel 8. Rotation of the rotor causes axial advance of the catalyst from the open channel 8 into the tubular conduit 7 and through the latter to the discharge end of the rotor. The rate of delivery of the catalyst to the rotor is so correlated to the capacity and rate of rotation of the rotor and the rate of discharge of the rotor as to maintain within the lower portion of each coil of the conduit 7 an arcuate sealing leg L of the catalyst. This sealing leg in each coil is of material length around the axis and the material forming it is compacted by gravity and caused to fill completely the cross section of the conduit. Each complete revolution of the rotor causes axial advance of the sealing leg to the next succeeding coil of the conduit without moving the material over the axis of the rotor. When the revolving hopper 11 is in a position beneath the axis it receives the catalyst from the last coil of the conduit. Then, the hopper moves to a position above the axis, as shown in Figs. 1 and 2, and discharges the catalyst through the spout 12 and the sealed chute 20 to the reaction chamber 40.

It is customarily required that a superatmospheric pressure be maintained within the reaction chamber 40. This pressure will exist in the chute 20 also and will be maintained by the sealing legs of catalyst within the coils of the rotating tubular conduit, and by the sealing structure between the stationary chute 20 and the rotor. Axial displacement of the rotor under such pressure is prevented by the swivel connection between the rotor and the chute 20. The chute is provided with a valve 55 to cut off communication between the reaction chamber 40 and the rotor when the latter is out of service. The rotor and the chute 20 will desirably be covered with heat insulation, a portion of which is indicated at 56, at one end of the rotor. There, a dust plate 57, upon the chute 46 is also shown, to close the entrance aperture of the rotor, around the chute.

It will be seen that my invention provides for handling of the granular material in a manner to provide an effectual seal and also avoid pinching or crushing of grains of the material. While the invention is described in connection with a catalytic reaction system its utility is not limited to such service. It may be employed satisfactorily in other services where a granular material must be transferred with maintenance of a pressure differential and with maintenance of the grains of the material intact.

It is to be understood that the present disclosure of my invention is merely illustrative and in nowise limiting and that the invention comprehends such modifications as will come within the scope of the following claims.

I claim:

1. A feeder device for granular material, comprising a rotor defining a tubular multi-coil helican conduit open at its ends for reception and discharge respectively, of said material, a mounting supporting said rotor for rotation about the helix axis of said conduit in a non-vertical position to cause gravitation of the material within the conduit to one side of the axis and thereby form of the material a plurality of gas seals within the successive coils, and a hopper fixed to rotate with the conduit, the discharge end of the conduit opening into said hopper and the latter extending radially inward from the conduit and having an outlet at its inner end for discharge of the material from the rotor.

2. A feeder device for granular material, comprising a rotor defining a tubular multi-coil helical conduit open at its ends for reception and discharge respectively, of said material, a mounting supporting said rotor for rotation about the helix axis of said conduit in a non-vertical position to cause gravitation of the material within the conduit to one side of the axis and thereby form of the material a plurality of gas seals within the successive coils, a hopper fixed to rotate with the conduit, the discharge end of the conduit opening into said hopper and the latter extending radially inward from the conduit and having an outlet at its inner end for discharge of the material from the rotor, a tubular chute supported in a fixed position in receiving relation to the outlet of the hopper, and a gas-tight sealing connection between said chute and the hopper outlet.

3. A feeder device for granular material, including a rotor comprising a pair of concentric drums, the outer drum projecting axially beyond one end of the inner drum, a helical wall extending between the concentric walls of said drums and defining therewith a helical tubular conduit, said helical wall extending into the portion of the outer drum projecting from said end of the inner drum and defining, with the outer drum, an open channel to receive the material and pass it to the tubular conduit, the rotor including a hopper at the opposite end thereof and fixed to rotate therewith, and the discharge end of the conduit opening into said hopper, the hopper extending radially inward and having an outlet for discharge of the material from the rotor, and a mounting supporting the rotor for rotation about the helix axis of said conduit in a non-vertical position to cause gravitation of the material within the conduit to one side of the axis and thereby form a gas seal within the conduit, for axial advance of the material along the conduit to said hopper and for maintenance of the gas seal during said advance.

4. A feeder device for granular material, comprising a rotor defining a tubular helical conduit open at its opposite ends for reception and discharge respectively, of said material, a mounting supporting said rotor for rotation about the helix axis of said conduit in a non-vertical position to cause gravitation of the material within the conduit to one side of the axis and thereby form of the material a gas seal within the conduit, and a hopper fixed to rotate with the conduit, the discharge end of the conduit opening into said hopper and the latter extending radially inward from the conduit and having an outlet at its inner end for discharge of the material from the rotor.

5. A feeder device for granular material, comprising a rotor defining a tubular helical conduit open at its opposite ends for reception and discharge respectively, of said material, a mounting supporting said rotor for rotation about the helix axis of said conduit in a non-vertical position to cause gravitation of the material within the conduit to one side of the axis and thereby form of the material a gas seal within the conduit, and a hopper fixed to rotate with the conduit, the discharge end of the conduit opening into said hopper and the latter extending radially inward and having a discharge spout substantially on the axis of the rotor and inclined with reference to the axis outwardly and away from the receiving end of the hopper.

6. A feeder device for granular material, including a rotor comprising a pair of concentric drums, the outer drum projecting axially beyond one end of the inner drum, a helical wall extending between the concentric walls of said drums and defining therewith a helical tubular conduit coaxial with the drums and open at its ends for reception and discharge respectively, of said material, said helical wall extending into the portion of the outer drum projecting from said end of the inner drum and defining, with the outer drum, an open helical channel to receive the material for passage to said tubular conduit, and means supporting the rotor for rotation about the helix axis of said conduit in a horizontal position to cause gravitation of the material within the conduit to one side of the axis and thereby form of the material a gas seal within the conduit, for axial advance of the material through said channel and conduit and for maintenance of the gas seal during said advance.

JOHAN E. A. GRAAE.

REFERENCES CITED

The following references are of record in the file of this patent:

UNITED STATES PATENTS

| Number | Name | Date |
| --- | --- | --- |
| 1,350,627 | Ten Broeck et al. | Aug. 24, 1920 |
| 1,581,933 | Larsen | Apr. 20, 1926 |

FOREIGN PATENTS

| Number | Country | Date |
| --- | --- | --- |
| 580,626 | Germany | Aug. 18, 1931 |